United States Patent [19]
Funathu

[11] Patent Number: 5,191,471
[45] Date of Patent: Mar. 2, 1993

[54] ADJUSTING MECHANISM OF BINOCULARS

[75] Inventor: Gouzi Funathu, Tokyo, Japan

[73] Assignee: Asahi Kogaku Kogyo Kabushiki Kaisha, Tokyo, Japan

[21] Appl. No.: 726,202

[22] Filed: Jul. 5, 1991

[30] Foreign Application Priority Data

Jul. 6, 1990 [JP] Japan ................................. 2-178540
Nov. 30, 1990 [JP] Japan ................................. 2-336523

[51] Int. Cl.⁵ ....................... G02B 7/06; G02B 23/18
[52] U.S. Cl. ............................................. 359/414
[58] Field of Search ............................. 359/407–418, 359/425, 422

[56] References Cited

U.S. PATENT DOCUMENTS

| | | | |
|---|---|---|---|
| 937,834 | 10/1909 | Martin et al. | 359/414 |
| 2,811,895 | 11/1957 | Jensen | 359/414 |
| 3,100,404 | 8/1963 | Boeddeker et al. | |
| 3,484,149 | 12/1969 | Becker et al. | 359/414 |
| 3,712,704 | 1/1973 | Sato | 359/416 |
| 4,630,901 | 12/1986 | Altenheiner et al. | 359/414 |
| 4,750,823 | 6/1988 | Riedl | 359/414 |
| 4,989,963 | 2/1991 | Farnung et al. | 359/414 |
| 5,071,242 | 12/1991 | Yanagisawa . | |

FOREIGN PATENT DOCUMENTS

| | | |
|---|---|---|
| 0102332 | 3/1984 | European Pat. Off. . |
| 2612331 | 9/1988 | France . |
| 765272 | 1/1957 | United Kingdom . |
| 849763 | 10/1960 | United Kingdom . |
| 854711 | 11/1960 | United Kingdom . |
| 880826 | 10/1961 | United Kingdom . |
| 884213 | 12/1961 | United Kingdom . |
| 900555 | 7/1962 | United Kingdom . |
| 1438140 | 6/1976 | United Kingdom . |
| 2236380 | 3/1991 | United Kingdom . |

Primary Examiner—Jon W. Henry
Attorney, Agent, or Firm—Sandler, Greenblum & Bernstein

[57] ABSTRACT

In a binocular, an operating knob member is provided for operating an adjusting mechanism such as a diopter difference adjusting mechanism by rotation thereof. The operating knob is arranged to be shiftable between two positions in which the amount of the externally protruded portion of the knob is relatively small and large, respectively. When the operating knob is operated, it is positioned at its largely protruded position, while when the operating knob is not necessary, it is positioned at its less protruded position.

17 Claims, 5 Drawing Sheets

ADJUSTING MECHANISM OF BINOCULARS

BACKGROUND OF THE INVENTION

The present invention relates to an adjusting mechanism for binoculars, such adjustment operations as focusing adjustment, diopter difference adjustment and the like are carried out by rotational movement of an operating member.

Binoculars, having a pair of right and left telescopic optical systems, optical axes of which are arranged in parallel, are provided with various adjusting mechanisms such as a focusing mechanism, a diopter difference adjusting mechanism, and a magnifying power changing mechanism, if the binoculars is a magnifying-power-changeable type.

The focus adjusting mechanism enables eyepiece lenses of both the right and left telescopic optical systems to simultaneously move in the direction of the optical axes thereof. The diopter difference adjusting mechanism enables one of the eyepiece lenses to move in the direction of the optical axis thereof with respect to the optical axis of the others eyepiece lens. By operating the diopter difference adjusting mechanism, a diopter difference between the right and left eyes of a user are compensated. Focusing operation should be performed by the focusing mechanism after the diopter difference has been compensated for by the diopter difference adjusting mechanism.

In the adjusting mechanisms of the binoculars, as above, an adjusting member rotatably driving the mechanism is disposed between the pair of telescopic optical systems in general use. When an operating member, such as a knob, which is fixedly secured to the adjusting member, is rotated, the adjusting mechanism is driven.

The operating member is exposedly disposed so as to be easily operated.

With aspect to the diopter difference adjusting mechanism, however, once the eyepiece lenses is moved to compensate for the diopter difference of a user, the adjustment is not needed any more providing the same user uses the binoculars. Further, it is clear that there is no need for adjusting the diopter difference during the operation of the binoculars. If the diopter difference adjusting mechanism is driven after the adjustment thereof, another adjusting operation should be performed, which causes the operation of the binoculars to be very troublesome.

Previously, the operating of the diopter difference adjusting member is preferably formed to have an operable configuration, and disposed at an easy-to-operate position for quick operation. On the other hand, currently, in order to prevent the erroneous operation thereof, the operating member should be formed to be inoperable and disposed at a hard-to-operate position.

Even in the focusing mechanism, when an object distance is nearly infinite, or the difference of the objects distances between precedingly observed object and currently observed objects is relatively small, there are cases in which the observation is preferably executed with a fixed focus. Focusing is dependent upon the depth of focus of the optical system or on the adjusting function of the eyes. In such cases, the operating member of the focusing mechanism is required to satisfy two contrary conditions, that is, easy-to-operate and hard-to-operate conditions which are the same as those required in the case of the diopter difference adjusting mechanism.

SUMMARY OF THE INVENTION

It is therefore an object of the present invention to provide an improved adjusting mechanism for binoculars having an excellent operability when in use, and being inoperable when the adjusting operation is not needed thus preventing any erroneous operation.

For the above object, according to the present invention, there is provided a binocular which comprises:

An operable member arranged inside the binocular;

An operating member, mounted on the binocular to be externally controllable, operating the operable member. The operating member is arranged to be shiftable between first and second positions. The amount of external projection of the operating member at the first position is larger than that at the second positions.

A holding means selectively holding the operating member at one of the first and second positions.

Optionally, the operable member comprises a rotary member, wherein the operating member is relatively movably coupled to the rotary member in such a fashion that the first and second positions of the operating member are determined with respect to the rotary member.

Further, the rotary member comprises a rotary shaft member, and the operating member comprises an operating knob being for coaxially coupled to one end of the rotary shaft member.

Further, optionally, the rotary shaft member is provided with a cam groove formed on the outer circumferential surface thereof and extending in its axial direction. When the operating knob member is provided with an inwardly extending protrusion formed on the inner circumferential surface thereof, the protrusion is received in the cam groove so to be relatively slidable with respect to the rotary shaft member.

According to another aspect of the invention, there is provided a binocular, which comprises:

First and second operable members arranged inside the binocular;

A first operating member, rotatably mounted on the binocular being externally controlled to rotatably operate for the first operable member;

A second operating member, rotatably mounted on the binocular being externally controlled to rotatably operate the second operable member. The second operating member is coaxially arranged with the first operating member and rotatably fitted in the first operating member. The second operating member is shiftable between first and second positions. The amount of external projection of the operating member at the first position is larger than that at the second position; and A holding means selectively holding the second operating member at one of the first and second positions.

Optionally, the first and second operating members are formed to be large- and small-diameter circular cylinders, respectively. The binocular comprises a bearing member fixedly secured to the binocular, with the bearing member having a cylindrical portion arranged between the large- and small-diameter circular cylinders. Outer and inner diameters of the cylindrical portion correspond to the inner diameter of the large-diameter circular cylinder and the outer diameter of the small-diameter circular cylinder, respectively, whereby the rotational movement of the large- and small-diameter circular cylinder, and the sliding movement of the small-diameter circular cylinder are stabilized.

DESCRIPTION OF THE EMBODIMENTS

Figure 1:
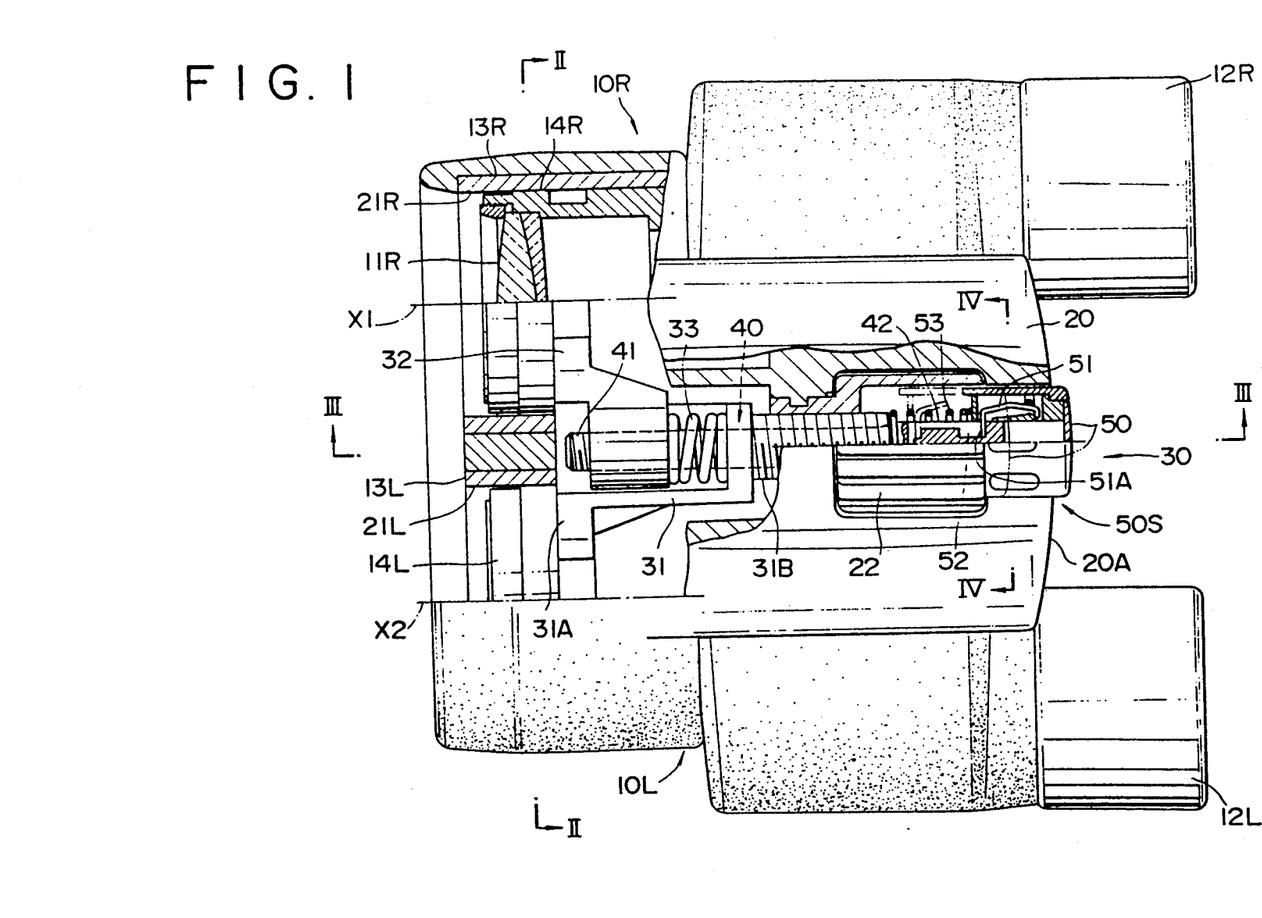
FIG. 1 is a partially broken plan view of binoculars embodying the present invention.
Figure 2:
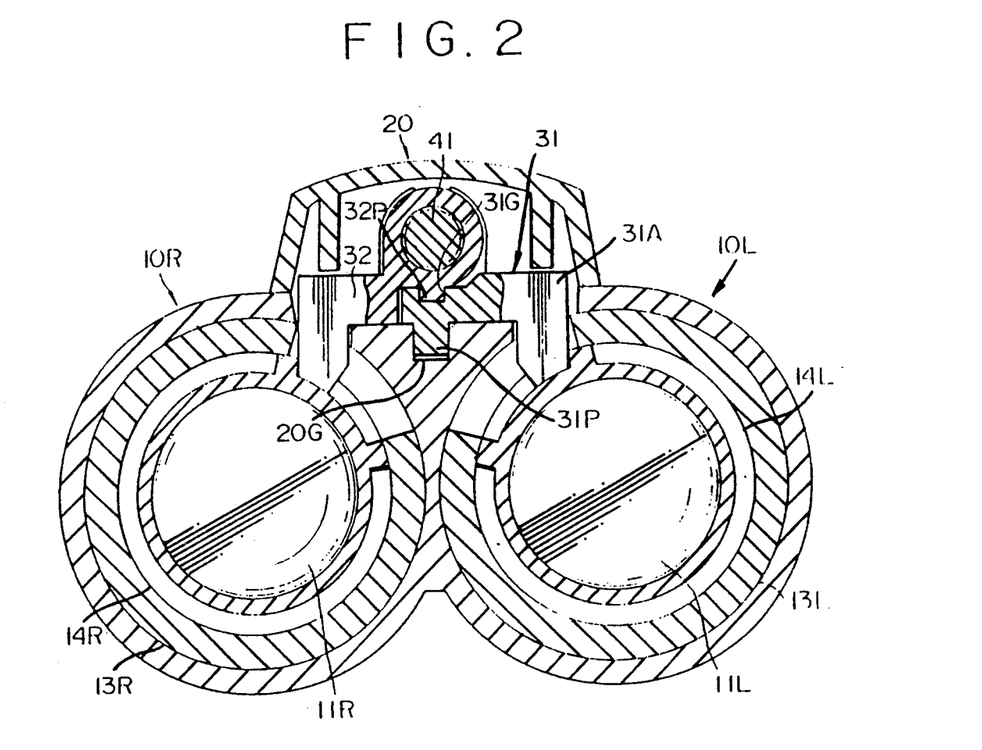
FIG. 2 is a cross-sectional view taken along the line II—II of FIG. 1.
Figure 3:
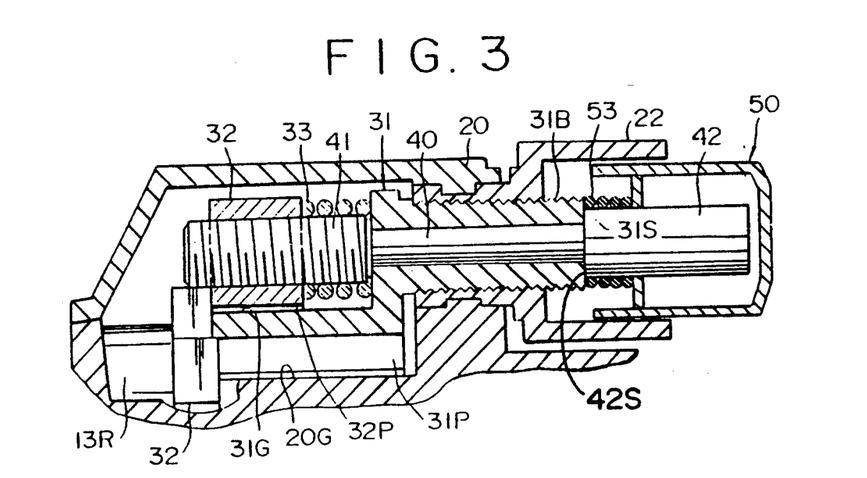
FIG. 3 is a cross-sectional view taken along the line III—III of FIG. 1.

FIG. 1 is a partially broken-away plan view of binoculars provided with a diopter difference adjustment mechanism, FIGS. 2 and 3 are a cross-sectional view taken along the line II—II and line III—III of FIG. 1, respectively.

The binoculars shown in the figures has a pair of right and left telescopic optical systems 10R and 10L, and a binocular body or retaining member 20. The right and left telescopic optical systems 10R and 10L have a pair of right and left objective lens barrels 13R and 13L, in which right and left objective lenses 11R and 11L are provided, and right and left eyepieces 12R and 12L, respectively. The retaining member 20 is formed therein with a pair of right and left retaining bores 21R and 21L in which the right and left objective lens barrels 13R and 13L are rotatably and slidably fitted, respectively. It should be noted that the objective lens barrels 13R and 13L are rotatably arranged about the optical axes X1 and X2 of the objective lenses 11R and 11L, respectively. In the right and left telescopic optical systems 10R and 10L, Porro prisms are incorporated as erect prisms, respectively, and the eyepieces 12R and 12L are eccentrically arranged with respect to the objective lenses 11R and 11L, respectively. In other words, the pair of telescopic optical systems 10R and 10L are rotatably mounted on the retaining member 20, with both being fitted in the respective retaining bores 21R and 21L.

The pair of telescopic optical systems 10R and 10L are arranged to be symmetrically rotated about the axes X1 and X2, respectively, by use of a well-known interlocking mechanism, not shown. Thus, the distance between a pair of right and left eyepieces 12R and 12L can be changed by rotating the telescopic optical systems 10R and 10L about the respective optical axes X1 and X2.

Lens frames 14R and 14L, holding the objective lenses 11R and 11L, are fitted in the objective lens barrels 13R and 13L, respectively. The lens frames 14R and 14L are slidable in the direction of the optical axes X1 and X2 of the objective lenses 11R and 11L, respectively.

An adjusting mechanism 30 having two functions, which are a diopter difference adjusting function and a focusing function, is disposed on the central upper surface of the retaining member 20 above the portion between the pair of telescopic optical systems 10R and 10L (between retaining bores 21R and 21L).

The adjusting mechanism 30 is provided with a slider 31 which extends in the direction parallel to the optical axes X1 and X2. The slider 31 is formed with a protruded portion 31P which extends in the direction parallel to the optical axes X1 and XZ. The protruded portion 31P is slidably engaged with a guide portion 20G, which is formed on the retaining member 20. The slider 31 is slidably driven by an operating roller 22, which is rotatably mounted on the retaining member 20.

An operating arm 31A, which is engaged with the lens frame 14L, is integrally formed to the be projected to front side (left-hand side in FIG. 1) of the slider 31. Hereinafter, the objective lens barrels side is referred to as a front side, and the eyepiece lens barrels side is referred to as a rear side. A focusing screw 31B is integrally formed on the rear side of the slider 31, extending in parallel with the optical axes X1 and X2 of the objective lenses 11R and 11L, toward the eyepiece lens barrels 12R and 12L side.

The focusing screw 31B is engaged with a thread formed on the inner peripheral surface of operating roller 22. Thereby, the slider 31 can be driven to slide in the direction parallel to the optical axes X1 and X2 of the object lenses 11R and 11L upon rotary operation of the operating roller 22.

Further, a diopter difference adjusting shaft 40 is rotatably fitted in the focusing screw 31B. The diopter difference adjusting shaft 40 is formed with a threaded portion 41 on the peripheral surface of a front end side portion thereof, and with a large-diameter portion 42 at the rear end side portion thereof. On the large-diameter portion 42, an engaging groove 52 is formed, which will be described later.

The slider 31, integrally constructed with the focusing screw 31B, is fitted on the diopter difference adjusting shaft 40. To the front side of the slider 31, a sliding arm 32 is provided to engage the threaded portion 41 of the diopter difference adjusting shaft 40. An end of the sliding arm 32 is engaged with the lens frame 14R so that the lens frame slides when the sliding arm 32 is slidingly moved. It should be noted that the sliding arm 32 is formed with a protruded portion 32P which is fitted in and guided by a groove 31G formed on the slider 31, so that it slides only in the extending direction of the diopter difference adjusting shaft 40, and that it does not rotate about the diopter difference adjusting shaft 40.

A spring 33 is provided around the diopter difference adjusting shaft 40, between the slider 31 and the sliding arm 32, as that it neutrally widens the distance between the slider 30 and the sliding arm 32 in the extending direction of the diopter difference adjusting shaft 40. Thus, a step portion 42S of the large-diameter portion 42 is caused to abut against the rear end surface 31S of the focusing screw 31B. Further, since the sliding arm 32 is biased toward left in the figure (toward the front side), backlash between the diopter difference adjusting shaft 40 and the sliding arm 32 is canceled.

Constructed as above, when the diopter difference adjusting shaft 40 is rotated, only the sliding arm 32 slides. Thus, the lens frame 14R is moved with respect to the lens frame 14L. In other words, the objective lens 11R of the right-side lens barrel 10R can be moved and adjusted with respect to the left-side objective lens 11L. Thus the diopter difference adjustment can be performed with respect to the diopter of the left eye of the user.

After the diopter difference adjustment has been performed, by rotating the operating roller 22 in order to simultaneously slide the slider 31 and the sliding arm 32, or lens frame 14R and 14L, the focusing operation is performed.

An operating knob 50 for rotating the diopter difference adjusting shaft 40 is connected to the rear side end of the diopter difference adjusting shaft 40.

Figure 4:
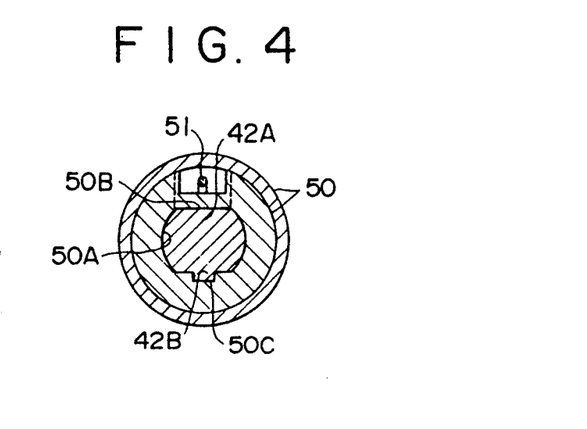
FIG. 4 is a sectional view of the operating knob corresponding to the section IV—IV of FIG. 1.

FIG. 4 shows a cross-sectional view of the operating knob 50 and the large-diameter portion 42. The operating knob 50 is formed with an engaging bore 50A in such a fashion that a plane portion 50B and groove 50C are oppositely formed on the inner peripheral surface of the operating knob 50. Both the plane portion 50B and the groove 50C extend in the direction of the rotary axis of the operating knob 50.

The large-diameter portion 42 is formed with a plane face 42A and cylindrical column 42B, which correspond to the plane portion 50B and the groove 50B of the operating knob 50, respectively. Thus, the operating knob 50 is slidably fitted on the large-diameter portion 42, such that the knob 50 can not be rotated with respect to the large-diameter portion 42.

The operating knob 50 is provided with a suspension spring 51 that has a circular cross-section. One end of the suspension spring 51 is bent to form a hook portion 51A extending in the radius direction of the engaging bore 50A. The bent portion 51A is movable in the radius direction of the operating knob 50, and rockable in the direction perpendicular to the rotary axis of the operating knob 50 by a predetermined amount, due to the elasticity of the suspension spring 51.

A return spring 53 is provided around the large-diameter portion 42, and the operating knob 50 is fitted on the rear end of the large-diameter portion 42. In this connection, the hook portion 51A is inserted into the engaging groove 52. Thus, the operating knob 50 is biased rearward by the return spring 53, and the hook portion 51A is engaged with the holding portion 52A of the engaging groove 52, so that the operating knob 50 is prevented from being dropped from the large-diameter portion 42.

Figure 5:
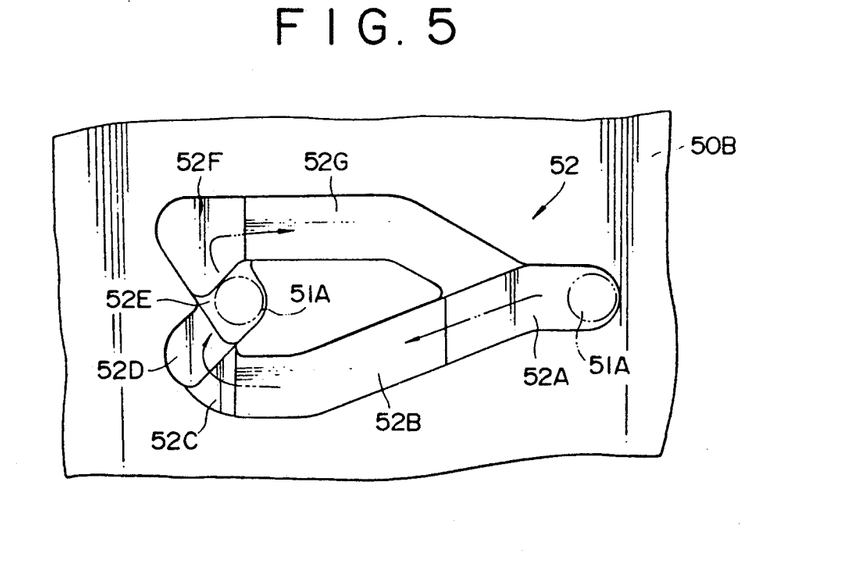
FIG. 5 is an enlarged plan view of the engaging groove.

FIG. 5 is an enlarged plan view of the engaging groove 52. In the figure, the right and left sides correspond to those of FIG. 1.

The engaging groove 52 has such a width that the hook portion 51A of the engaging spring 51 can be moved therealong. The engaging groove consists of a forward path running from the holding portion 52A to another V-shaped holding portion 52E through portions 52B, 52C and 52D, and a backward path from the portions 52E to 52A through portions 52F and 52G. The forward path runs from the holding portion 52A toward another holding portion 52E, and turns back at the U-shaped portion where the forward path is connected to the V-shaped holding portion 52E. The backward path runs from the other one of V-shaped holding portion 52E, which is also U-shaped, to the holding portion 52A.

Figure 6:
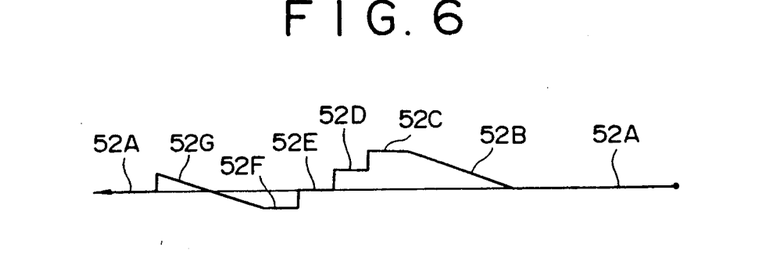
FIG. 6 is a diagram showing the changes of the depth of the engaging groove.

As shown in FIG. 6, the depth of the engaging groove 52 is varied in accordance with the portions thereof. FIG. 6 shows the depth of the engaging groove 52 when the hook portion 51A travels along the engaging groove 52. The depth of the groove 52 becomes gradually shallower in the portion 52B and becomes shallowest at the portion 52C. The depth of the groove changes deeper from the portions 52D through 52F stepwisely. In the portion 52G, the groove 52 gradually, becomes shallow so that it is shallower than the depth at the portion 52A. And, the portion 52G is connected to the portion 52A.

Constructed as above, the hook mechanism functions as follows.

When the hook portion 51A is engaged with the portion 52A, the distance between a rear end portion 50S of the operating knob 50 and the rear end surface 31S of the focusing screw 31B is relatively large. The rear end portion 50S protrudes from a rear end plane 22A of the operating roller 22 sufficiently to allow rotation.

When the operating knob 50 is pushed against the force exerted by the return spring 53 from this state, the operating knob 50 is suspended in the pressed condition, which is shown by dotted line in FIG. 1. The distance between the rear end portion 50S of the operating knob 50 and the rear end of the large-diameter portion 42 becomes relatively small, thus the rear end portion 50S is prevented from being erroneously operated.

As the operating knob 50 is pushed forward against the force exerted by the return spring 53, the tip of the hook portion 51A of the suspension spring 51 moves along the engaging groove 52 from portions 52A to 52D via portions 52B and 52C. Since the tip of the hook portion 51A is biased toward the bottom of the groove 52 in the depth direction thereof, the tip of the hook portion 51A does not move toward portion 52G when pushed at the portion 52A.

When the pressing force of the operating knob 50 is released after the tip of the hook portion 51A has been located at portion 51D, the operating knob 50 is pressed backward by the force exerted by the return spring 53. In this case, since steps are formed at the boundaries between the portions 52C and 52D, 52D and 52E, and since the portions 52C and 52D are shallower than the portion 52D and 52E, respectively, the tip of the hook portion 51A cannot move from the portion 52D to the portion 52C, therefore it moves to the portion 52E and is suspended thereat.

As the operating knob 50 is pushed against the return spring 53, when the tip of the hook portion 51A is located in the portion 52E, since a step is formed at the boundary between the portions 52A and 52D, and the portion 52D is shallower than the portion 52E, the tip of the bent portions 51A cannot move from the portion 52E to the portion 52D. Further, a step is formed at the boundary between the portion 52F and 52E, and the portion 52F is deeper than the portion 52E. The tip of the hook portion 51A moves from portion 52E to the portion 52F. After that, the tip of the hook portion 51A is moved along the obliquely formed portion 52G, past the step formed between the portion 52G due to the force exerted by the return spring 53, and then hooked at the holding portion 52A.

In other words, during the pushing operation, the operating knob 50 is alternatively located at two positions; an operable position in which the rear end portion 50S protrudes so as to be easily rotated, and an inoperable position in which the rear end portion 50S of the operating knob 50 does not protrude enough to be easily rotated. Accordingly, after the operating knob 50 has been rotatably operated at the operable position to adjust the diopter difference, the operating knob 50 can be pushed and positioned at the inoperable position. Thus an erroneous operation of the diopter difference adjusting mecahanism can be prevented.

It should be noted that the arrangement of the hooking mechanism is not limited to the above described arrangement, but can be properly modified. Further, although the preferred embodiment of the present invention is applied to the diopter difference adjusting mechanism, it is needless to say that the present invention can be applied to any other adjusting mechanism such as the focus adjusting mechanism, etc.

Figure 7:
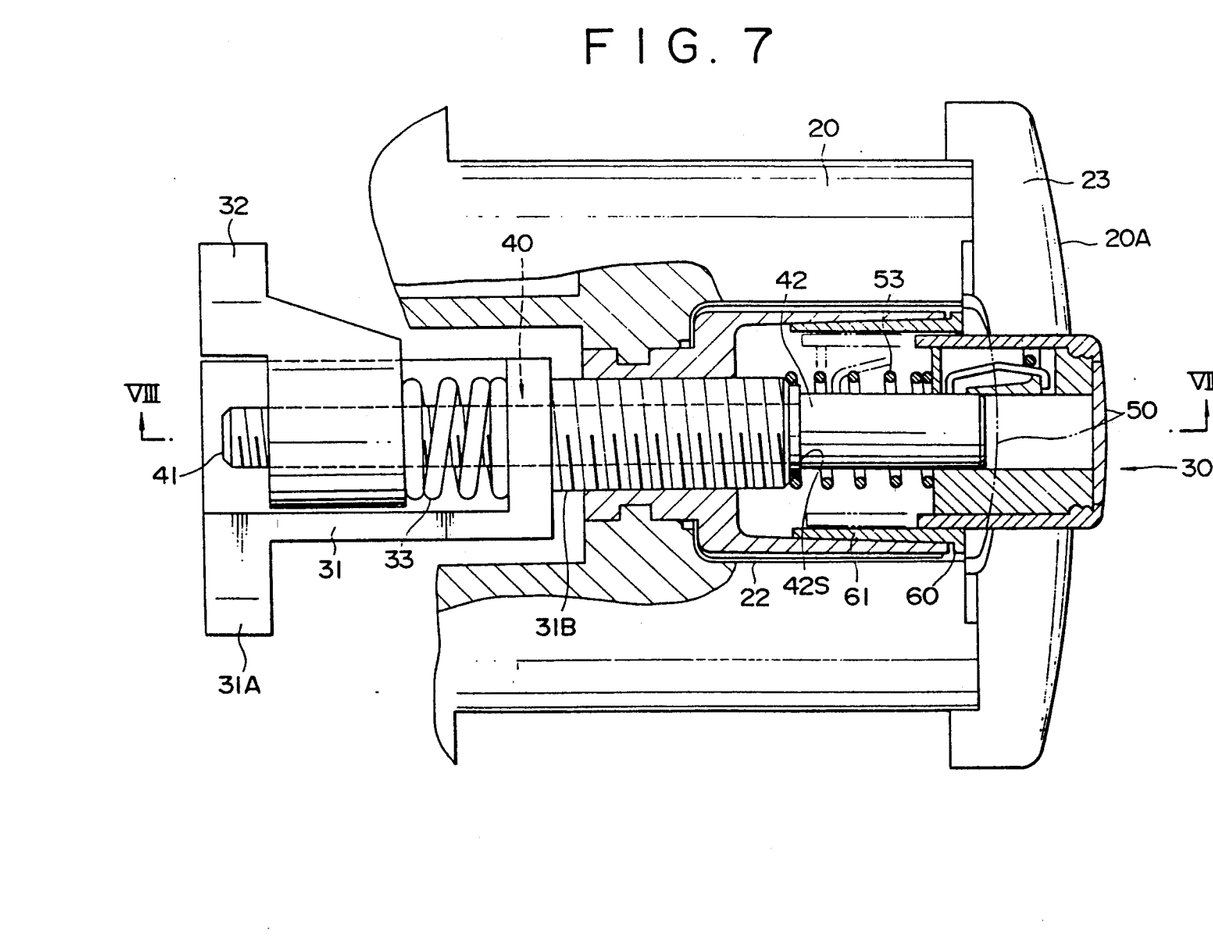
FIG. 7 is a partially broken plan view of another preferred embodiment of the present invention.
Figure 8:
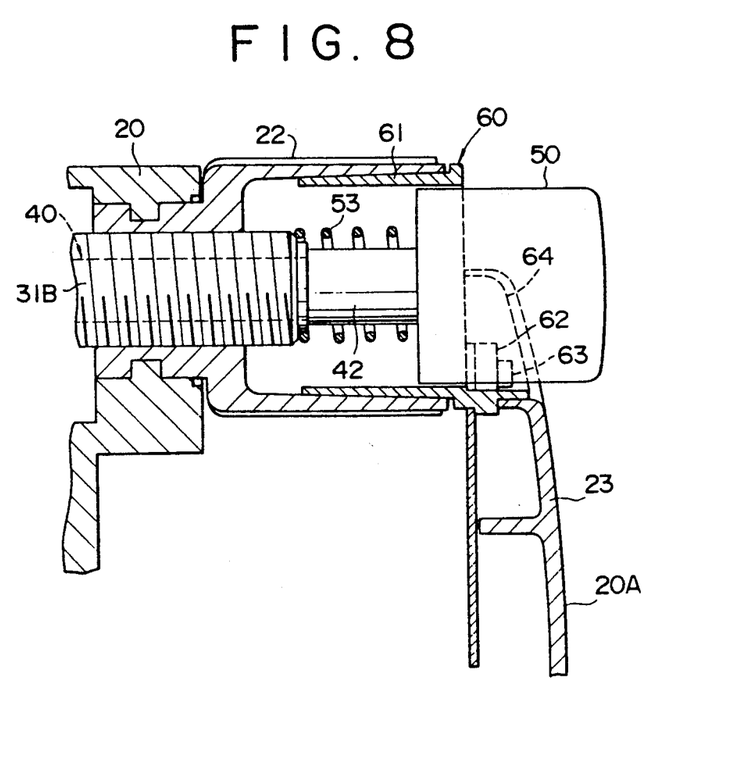
FIG. 8 is a sectional view taken along with the line VIII—VIII of FIG. 7.
Figure 9:
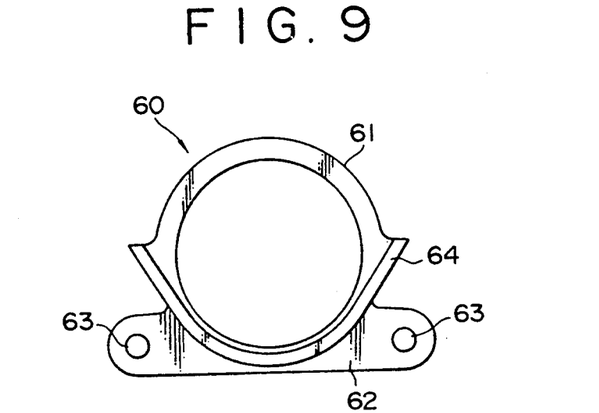
FIG. 9 is a rear elevational view of the bearing member for the operating knob member.

FIGS. 7 through 9 show a modified embodiment according to the present invention.

In this modification, bearings 60 for rotatably supporting the operating knob 50 and the operation roller 22, and for guiding the sliding movement of the operating knob 50, are fixedly secured to the retaining member 20 so as to stabilize the movement of the operating knob 50 and the operation roller. The basic composition of this modified embodiment is equivalent to that of the preceding embodiment, and like elements are denoted by like numerals, and description thereof is omitted.

The bearings 60 is composed such that a pair of right and left fixing protrusions 62, to be connected to the retaining member 20, are integrally arranged below the rear end of a cylindrical bearing portion 61.

The bearing portion 61 had an outer diameter corresponding to the inner circumference of the operation roller 22 with a predetermined tolerance, and has an inner diameter corresponding to the outer circumference of the operating knob 50 with another predetermined tolerance.

The fixing protrusions 62 are arranged between the back cover 23, which is attached to the rear end of the retaining member 20, and fixedly mounted thereon. Note that the reference numeral 64 in the figure is an arc-shaped flange to be fitted to a notch formed on the rear cover 23 corresponding to the outer circumference of the operating knob 50.

On the back surface of the tip of the fixing protrusion 62, positioning dowels 63 are provided. Insertion holes (not illustrated) are formed on the rear cover 23 corresponding to the positioning dowels 63. By securing the back cover 23 with the positioning dowels 63 being engaged with the insertion holes, the bearing 60 is fixedly secured at a predetermined position. Note that the rear cover 23 is fixed with screws (not shown) which are inserted from the rear end plane 20A side and are screwed to the retaining member 20.

With the bearing 60 fixed as described above, the tip of the bearing portion 61 is fitted in the operation roller 22 by a predetermined depth (length). The rear end portion thereof protrudes by a predetermined amount from the rear end plane of the operation roller 22. Thus, as shown in FIGS. 7 and 8, even though the operating knob 50 is in an operable state thereof (i.e., in the protruded state), the front end portion of the operating knob 50 is to be inserted in the bearing portion 61 by a predetermined amount.

As described above, according to the present invention, since the operating knob 50 can be rotatably supported by virture of the inner circumference of the bearing portion 61 of the bearing 60, the operating know 50 can be prevented from tottering during operations. Further, since the rear end portion of the operation roller 22 can be supported by the outer circumference of the bearing portion 61, the operation roller 22 can be prevented from tottering because the operation roller 22 is rotatably held at both ends thereof, thereby rotary operation can be performed stably and smoothly.

Further, since the operating knob 50 is less projected or sunk in the binoculars after the diopter difference adjusting operation has been completed, the operating knob 50 is prevented from contacting a user on the face in spite that the operation knob is disposed between the eyepieces.

With the adjusting mechanism for binoculars according to the present invention, the operating knob member is hooked in the positions, i.e., the one where the operating knob member protrudes from the binoculars body, and the other where the operating knob member is sunk in the binoculars body. Thus, excellent operability of the operating knob can be obtained when it is located at the position protruding from the binoculars body for the adjusting operation, while an erroneous operation is prevented since the operating knob can be sunk into the binoculars after the adjustment operation has been performed.

Further, the binoculars become compact and smart in appearance since the number of protrusions thereof is decreased by making the operating knob member retracted in the binoculars body.

The present disclosure relates to subject matters contained in Japanese Patent Applications Nos. HEI 2-178540, HEI 2-336523 (filed on Jul. 6, 1990 and Nov. 30, 1991) which are expressly incorporated herein by reference in their entireties.

What is claimed is:

1. A binocular, which comprises:
    a retaining member, said retaining member retaining right and left optical elements;
    an operable member arranged inside of said retaining member;
    an operating member mounted in said retaining member to be externally controllable for operating said operable member, said operating member being arranged to be shiftable between first and second positions, said second position being substantially within said retaining member, the amount of external projection of said operating member from said retaining member at said first position being larger than that at said second position; and
    holding means for selectively holding said operating member at one of said first and said second positions.

2. The binocular according to claim 1, wherein said operable member comprises a rotary member, and wherein said operating member is relatively movably coupled to said rotary member such that said first and said second positions of said operating member are determined with respect to said rotary member.

3. The binocular according to claim 2, wherein said rotary member comprises a rotary shaft member, and said operating member comprises an operating knob so to be coaxially coupled to one end of said rotary shaft member.

4. The binocular according to claim 3, wherein said rotary shaft member is provided with a cam groove formed on an outer circumferential surface thereof and extending in an axial direction of said rotary shaft member, and wherein said operating knob member is provided with an inwardly extending protrusion formed on an inner circumferential surface thereof, said protrusion being received in said cam groove to be relatively slidable to each other.

5. The binocular according to claim 4, wherein said cam groove comprises a pair of forward and backward guide paths connected to each other, and wherein A direction of relative sliding movement of said members becomes opposite in one of said paths to said other path.

6. The binocular according to claim 5, wherein said cam groove comprises a first holding portion, respective ends of said first holding portion being connected with one of the respective ends of said forward and said backward guide paths, and a substantially V-shaped second holding portion, respective ends of said second holding portion being connected with the other of the respective ends of said forward and said backward guide paths, said first and said second holding portions being arranged to be separated by a predetermined amount in the axial direction of said shaft member.

7. The binocular according to claim 6, wherein said operating knob is located at said first and said second operable position when said protrusion is positioned at said first and said second holding portions, respectively, and wherein said forward and said backward paths, and said first and said second holding portions form an endless circular path.

8. The binocular according to claim 7, wherein the portions where said forward and said backward guide paths are connected to said second holding portion are formed to be substantially U-shaped areas, respectively, so that said forward path runs from said first holding portion toward said second holding portion, turns back at one of said U-shaped areas, and wherein said backward guide path runs from the other one of said U-shaped areas, where said cam groove turns back, to said first holding portion.

9. The binocular according to claim 8, which further comprises a biasing means for biasing said operating knob in a direction in which said operation knob is separated from said rotary shaft member, wherein said protrusion is neutrally positioned at said V-shaped second position due to the biasing force of said biasing means when said protrusion is passed through one of said U-shaped areas, and wherein said protrusion is neutrally positioned at said first holding position due to the biasing force of said biasing means when said protrusion is passed through the other one of said U-shaped areas.

10. The binocular according to claim 6, wherein depth of said groove is varied so that said protrusion slides along said cam groove in a one-way direction.

11. The binocular according to claim 1, wherein the diopter difference is adjusted upon operation of said operable member.

12. A binocular, which comprises:
a retaining member;
first and second operable members arranged inside of said retaining member;
a first operating member rotatably mounted in said retaining member for being externally controlled to rotatably operate said first operable member;
a second operating member rotatably mounted on said retaining member for being externally controlled to rotatably operate said second operable member, said second operating member being co-axially arranged with said first operating member and rotatably fitted in said first operating member, said second operating member being shiftable between first and second positions, said second position being substantially within said retaining member, the amount of external projection of said operating member from said retaining member at said first position being larger than that at said second position; and
holding means for selectively holding said second operating member at one of said first and said second positions.

13. The binocular according to claim 12, wherein said first operable member comprises a slidable member to slide in a direction of a rotary axis of said first operating member upon rotation of said first operating member.

14. The binocular according to claim 13, wherein said second operable member comprises:
a rotatable shaft member to be rotated by said second operating member, and
an arm member slidable in a direction of a rotary axis of said second operating member, said arm member being slid upon rotation of said rotatable shaft member.

15. The binocular according to claim 14, wherein said rotatable shaft member is engaged with said slidable member such that said rotatable shaft member is driven to slide in the direction of the rotary axis of said second operating member upon sliding movement of said slidable member.

16. The binocular according to claim 15, wherein said binocular comprises a pair of objective lenses, the optical axes of said pair of objective lenses being parallel to each other, said pair of objective lenses being arranged to be slidable in the direction of their optical axes, respectively, and wherein rotary axis of said first and said second operating member are arranged to be parallel with the optical axes of said objective lenses, said slidable member being engaged with one of said pair of objective lenses so that said one of said pair of objective lenses is slid upon sliding movement of said slidable member, said arm member being engaged with the other of said pair of objective lenses so that said the other of said pair of objective lenses is slid upon sliding movement of said arm member.

17. The binocular according to claim 12, wherein said first and said second operating members are formed to be large-diameter and small-diameter circular cylinders, respectively, and wherein said binocular comprises a bearing member fixedly secured to said binocular, said bearing member having a cylindrical portion to be arranged between said large-diameter and said small-diameter circular cylinders, outer and inner diameters of said cylindrical portions being substantially the same as the inner diameter of said large-diameter circular cylinder and the outer diameter of said small-diameter circular cylinder, respectively, whereby rotational movement of said large-diameter and said small-diameter circular cylinder, and the sliding movement of said small-diameter circular cylinder are stabilized.

* * * * *